US009390751B1

(12) United States Patent
Hall

(10) Patent No.: US 9,390,751 B1
(45) Date of Patent: Jul. 12, 2016

(54) REDUCING OVERCOUNTING OF TRACK-LEVEL DAMAGE CAUSED BY ADJACENT-TRACK AND FAR-TRACK INTERFERENCE

(71) Applicant: HGST Netherlands B.V., Amsterdam (NL)

(72) Inventor: David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/877,290

(22) Filed: Oct. 7, 2015

(51) Int. Cl.
*G11B 27/36* (2006.01)
*G11B 5/09* (2006.01)
*G11B 19/02* (2006.01)
*G11B 20/10* (2006.01)
*G11B 20/12* (2006.01)

(52) U.S. Cl.
CPC ............ *G11B 20/10212* (2013.01); *G11B 5/09* (2013.01); *G11B 20/1217* (2013.01)

(58) Field of Classification Search
CPC ............ G11B 5/012; G11B 5/82; G11B 5/02; G11B 5/54; G11B 19/041; G11B 20/12; G11B 20/1217; G11B 20/10212; G11B 27/36; G11B 2220/20; G11B 2220/90; G11B 5/09; G11B 27/3027

USPC .................... 360/31, 55, 45, 48, 71, 75, 72.1; 711/106

See application file for complete search history.

(56) References Cited

U.S. PATENT DOCUMENTS

| 7,774,539 | B2 | 8/2010 | Mettler et al. |
| 8,331,053 | B2 | 12/2012 | Hobbet |
| 8,553,347 | B2 | 10/2013 | Watanabe et al. |
| 8,693,120 | B2 * | 4/2014 | Yang ................ G11B 20/10435 360/31 |
| 8,879,180 | B2 | 11/2014 | Deki et al. |
| 8,914,573 | B2 | 12/2014 | Kelkar et al. |
| 2012/0014013 | A1 | 1/2012 | Bandic et al. |
| 2013/0194690 | A1 | 8/2013 | Inoue |

* cited by examiner

*Primary Examiner* — Nabil Hindi
(74) *Attorney, Agent, or Firm* — Shumaker & Sieffert, P.A.

(57) ABSTRACT

A technique implemented by a processor may include controlling a write head to write data to at least one partition of a data track of a magnetic data storage medium. The data track may include a plurality of partitions. The technique also may include determining, for each partition of the at least one partition, whether the partition has been previously written to by inspecting a partition overlap register associated with the data track. The partition overlap register stores a respective entry for each partition indicating whether the partition has been previously written to. The technique also may include, in response to determining that at least one respective partition of the at least one partition has been previously written to, incrementing a damage counter of at least one adjacent track and resetting each entry of the partition overlap register to indicate that each respective partition has not been previously written to.

20 Claims, 5 Drawing Sheets

72a

| PARTITIONS | | | | | | ACTIVE TRACKS | | | |
|---|---|---|---|---|---|---|---|---|---|
| 0 | 1 | 2 | 3 | ... | 27 | 0 | 1 | 2 | 3 |

| PARTITIONS | | | | | |
|---|---|---|---|---|---|
| 0 | 1 | 2 | 3 | ... | 31 |

| ACTIVE TRACKS | | | |
|---|---|---|---|
| 0 | 1 | 2 | 3 |

FIG. 4B

REDUCING OVERCOUNTING OF TRACK-LEVEL DAMAGE CAUSED BY ADJACENT-TRACK AND FAR-TRACK INTERFERENCE

TECHNICAL FIELD

This disclosure relates to storage devices, such as magnetic data storage devices.

BACKGROUND

To increase capacity of magnetic storage systems, efforts are continually made to increase magnetic recording density. For example, capacity may be increased by increasing track density (i.e., by decreasing the width of data tracks and/or the distance between adjacent tracks). However, increased track density results in increased effects of adjacent-track interference (ATI) and far-track interference (FTI). That is, writing data to a particular data track can result in the degradation of signals written to adjacent or even non-adjacent data tracks. Repeated write operations to a track can result in irreversible damage to data written on these other tracks.

To prevent a loss of data, magnetic storage systems maintain in random access memory (RAM) a count of damage incurred by each data track. When that count reaches a pre-determined threshold level, the data track is "refreshed" by re-writing data to the data track. The refresh operations read an entire data track from the magnetic media, and then re-write the data to the magnetic media to ensure any damage or errors sustained by the data track are remedied. The time required for a refresh operation is time that cannot be spent on other operations, resulting in a degradation of magnetic storage system performance.

SUMMARY

In some examples the disclosure is directed to a method including controlling, by a processor, a write head to write data to at least one partition of a data track of a magnetic data storage medium. The data track may be partitioned into a plurality of partitions. The method also may include determining, by the processor, for each respective partition of the at least one partition, whether the respective partition has been previously written to by inspecting a partition overlap register associated with the data track. The partition overlap register may store a respective register entry for each respective partition indicating whether the respective partition has been previously written to. The method additionally may include, in response to determining that none of the respective partitions of the at least one partition has been previously written to: setting respective register entries associated with the respective partitions of the at least one partition to indicate that the respective partitions of the at least one partition have been written to, and refraining from incrementing the damage counter of the at least one adjacent track.

In some examples, the disclosure is directed to a storage device including a magnetic data storage medium, a write head, and a processor. The processor may be configured to control the write head to write data to at least one partition of a data track of the magnetic data storage medium. The data track may be partitioned into a plurality of partitions. The processor also may be configured to determine, for each respective partition of the at least one partition, whether the respective partition has been previously written to by inspecting a partition overlap register associated with the data track. The partition overlap register may store a respective register entry for each respective partition indicating whether the respective partition has been previously written to. The processor further may be configured to, in response to determining that none of the respective partitions of the at least one partition has been previously written to: set respective register entries associated with the respective partitions of the at least one partition to indicate that the respective partitions of the at least one partition have been written to, and refrain from incrementing the damage counter of the at least one adjacent track.

In some examples the disclosure is directed to a storage device including means for magnetically storing data, means for writing data to the means for magnetically storing data, and means for controlling the means for writing data to write data to at least one partition of a data track of the magnetic data storage medium. The data track may be partitioned into a plurality of partitions. The storage device also may include means for determining, for each respective partition of the at least one partition, whether the respective partition has been previously written to by inspecting a partition overlap register associated with the data track. The partition overlap register may store a respective register entry for each respective partition indicating whether the respective partition has been previously written to. The storage device additionally may include means for, in response to determining that none of the respective partitions of the at least one partition has been previously written to: setting respective register entries associated with the respective partitions of the at least one partition to indicate that the respective partitions of the at least one partition have been written to, and refraining from incrementing the damage counter of the at least one adjacent track.

In other examples the disclosure is directed to a non-transitory computer-readable storage medium including instructions that, when executed, configure one or more processors of a storage device to control a write head to write data to at least one partition of a data track of the magnetic data storage medium. The data track may be partitioned into a plurality of partitions. The computer-readable storage medium also may include instructions that, when executed, cause one or more processors of a storage device to determine, for each respective partition of the at least one partition, whether the respective partition has been previously written to by inspecting a partition overlap register associated with the data track. The partition overlap register may store a respective register entry for each respective partition indicating whether the respective partition has been previously written to. The computer-readable storage medium further may include instructions that, when executed, cause one or more processors of a storage device to, in response to determining that none of the respective partitions of the at least one partition has been previously written to: set respective register entries associated with the respective partitions of the at least one partition to indicate that the respective partitions of the at least one partition have been written to, and refrain from incrementing the damage counter of the at least one adjacent track.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A and 4B are example partition overlap registers that include active track indications.

DETAILED DESCRIPTION

Figure 1:
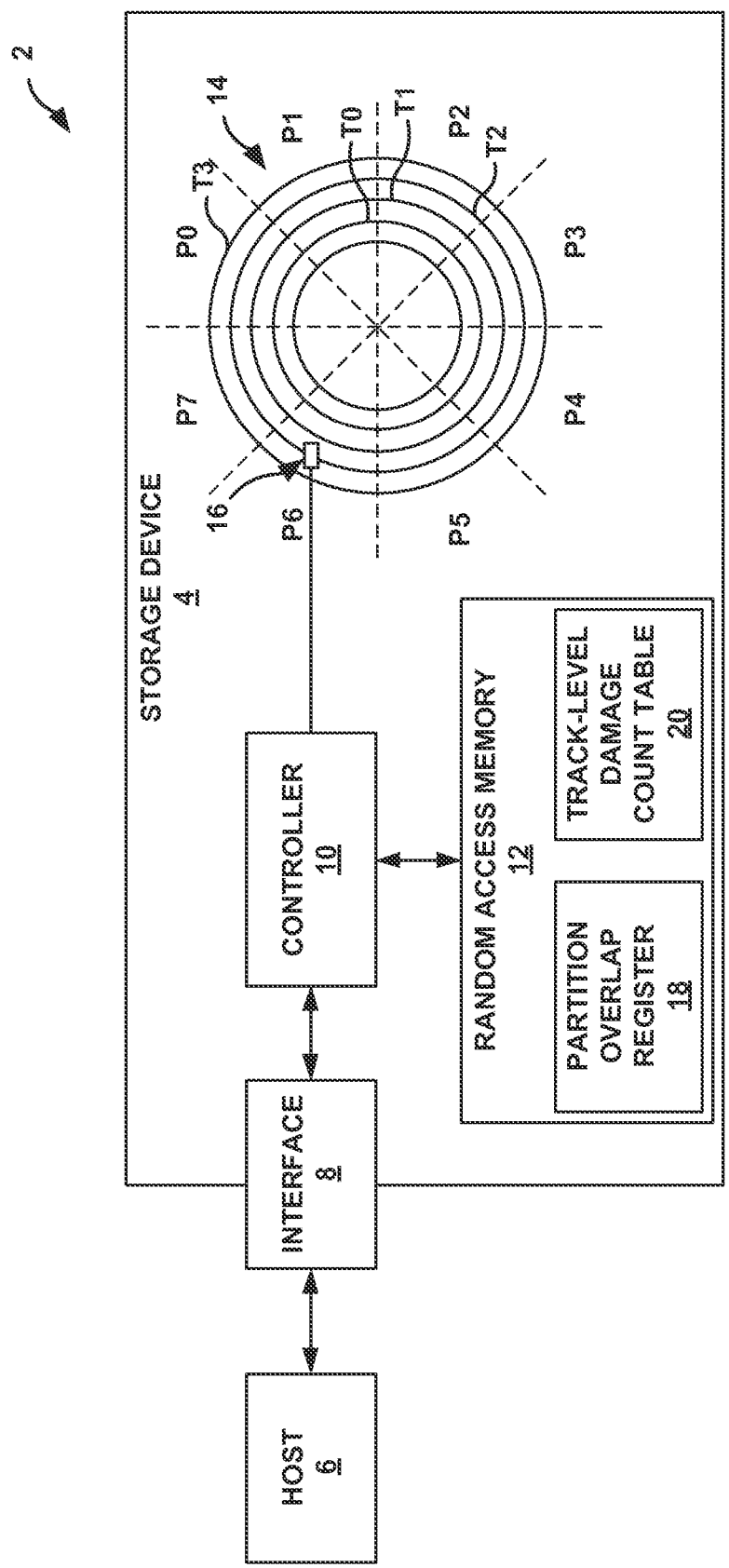
FIG. 1 is a conceptual and schematic block diagram illustrating an example magnetic storage system in which a storage device may interact with a host device.

In general, the disclosure describes techniques for reducing data refreshes initiated in response to a track-level damage counter exceeding a threshold damage counter value. Rather than applying damage to adjacent tracks by incrementing respective track-level damage counters associated with respective adjacent tracks each time data is written to a track, each track is divided into a plurality of partitions. As used herein, the term "adjacent track" may including immediately adjacent tracks and non-immediately adjacent tracks. In some examples, each partition may include a plurality of sectors, which are the smallest addressable units of a magnetic data storage device. Each track is associated with a partition overlap register, which includes a respective entry associated with each respective partition of the track. The partition entry indicates whether the associated partition has had data written to it since a last time damage was assigned to adjacent tracks by incrementing the damage counter associated with each of the adjacent tracks. Each time data is written to the track, a processor determines to which partitions the data is being written and inspects the partition overlap register to determine if the partitions to which the data is being written have been written to since the last time damage was assigned to adjacent tracks. If at least one partition to which data is being written has had data written to it since the last time damage was assigned to adjacent tracks, as indicated by the partition overlap register entry, damage is applied to the adjacent tracks and the partition overlap register entries, except for the partition overlap entry associated with the at least one partition to which data is being written that has had data written to it since the last time damage was assigned to adjacent tracks, are reset to indicate that these of the partitions have not been written to since damage the last time damage was assigned to adjacent tracks.

However, if none of the respective partitions of the at least one partition to which data is being written has had data written to it since the last time damage was assigned to adjacent tracks, no damage is applied to the adjacent tracks. Instead, the respective partition overlap register entries associated with the respective partitions of the at least one partition to which data is being written are updated to indicate that data has been written to these respective partitions since the last time damage was assigned to adjacent tracks. In this way, if data is written to different portions of the data track, damage is not needlessly applied to adjacent tracks, which may reduce a frequency with which refresh operations are performed. This may improve performance of the magnetic data storage device, as refresh operations require time, during which the data storage device may not be available to perform user requests. Further, as damage is not tracked on the partition level or the sector level, the memory requirements of the technique may be lessened compared to techniques that track damage on a partition level or a sector level.

FIG. 1 is a conceptual and schematic block diagram illustrating an example magnetic storage system 2 in which a magnetic data storage device 4 may interact with a host device 6, in accordance with one or more techniques of this disclosure. Host device 6 may utilize non-volatile memory devices included in magnetic data storage device 4 to store and retrieve data. In some examples, magnetic storage system 2 may include a plurality of storage devices, such as magnetic data storage device 4, that may operate as a storage array. For instance, magnetic storage system 2 may include a plurality of magnetic data storage drives 4 configured as a redundant array of inexpensive/independent disks (RAID) that collectively function as a mass storage device for host device 6. While techniques of this disclosure generally refer to magnetic storage system 2 and magnetic data storage device 4, techniques described herein may be performed in any storage environment that utilizes magnetic recording. In some examples, magnetic data storage drive 4 may include a hard disk drive (HDD), a tape drive, or the like.

Magnetic storage system 2 may include host device 6 which may store and/or retrieve data to and/or from one or more storage devices, such as magnetic data storage device 4. As illustrated in FIG. 1, host device 6 may communicate with magnetic data storage device 4 via interface 8. Host device 6 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Typically, host device 6 includes any device having a processing unit, which may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like. For the purpose of executing techniques of this disclosure, host device 6 may send data to controller 10 via interface 8 such that read/write transducer 16 may write data to tracks T0-T3 of magnetic data storage media 14, or host device 6 may receive data from controller 10 that were read from magnetic data storage media 14 by read/write transducer 16.

Magnetic data storage drive 4 may include interface 8 for interfacing with host device 6. Interface 8 may include one or both of a data bus for exchanging data with host device 4 and a control bus for exchanging commands with host device 4. Interface 8 may operate in accordance with any suitable protocol. For example, interface 8 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express (PCIe). The electrical connection of interface 8 (e.g., the data bus, the control bus, or both) is electrically connected to controller 10, providing electrical connection between host device 6 and controller 10, allowing data to be exchanged between host device 6 and controller 10. In some examples, the electrical connection of interface 8 may also permit magnetic data storage drive 4 to receive power from host device 6. Controller 10 may further include one or more features that may be used to in connection with techniques of this disclosure, including partition overlap register 18 and track-level damage count table 20.

Magnetic media data storage media 14 includes a plurality of concentric data tracks. For the sake of simplicity, only four such data tracks labeled T0, T1, T2, and T3 are illustrated in the example shown in FIG. 1, although in actuality magnetic data storage media 14 includes many more such data tracks, such as thousands of data tracks. In addition, magnetic data storage media 14 is conceptually divided into a plurality of partitions labeled P0-P7 for purposes of tracking write overlap. Although eight partitions P0-P7 are illustrated in FIG. 1, in other examples, magnetic data storage media 14 may include more or fewer partitions, such as a number of partitions that is a power of two (e.g., 4, 8, 16, 32, 64, 128, or the like partitions). The number of partitions may be selected based on the desired granularity for tracking write overlaps.

Although not shown in FIG. 1, magnetic data storage media 14 may be divided into a plurality of sectors. A sector may be the smallest unit of magnetic data storage media 14 that is independently addressable by controller 10. The number of sectors in one track (e.g., T0) of magnetic data storage media 14 may be different than the number of partitions into which a track (e.g., T0) is partitioned. For example, each partition may include a plurality of sectors, such as tens, hundreds, or thousands of sectors.

Although the example described with respect to FIG. 1 is a traditional hard disk drive, it should be understood that the techniques described herein may be utilized in other types of magnetic storage systems that may utilize, in addition to non-volatile memory in the form of magnetic data storage media 14, other types of non-volatile memory such as solid-state devices memory (e.g., NAND flash memory, NOR flash memory, phase change memory, MRAM memory, or the like). For example, a magnetic storage system may utilize magnetic data storage media 14 for user data, and solid state memory for storing miscellaneous data and parameter information, high priority user data, or combinations thereof.

Read/write transducer 16 is carried by an arm and mechanically positioned over one or more of the data tracks T0-T3 by an actuator that rotates the arm about a pivot under control of controller 10. Read/write transducer 16 allows data to be written to and read from a selected data track T0-T3. For example, in the example shown in FIG. 1, read/write transducer 16 is positioned over data track T2, allowing data to be read from or written to data track T2. In some examples, read/write transducer 16 may be controller by controller 10 to read and write data to particular sectors associated with a selected data track.

Controller 10 controls read and write operations associated with magnetic data storage media 14. In addition, as described in more detail below, controller 10 determines when to initiate refresh operations associated with data stored by magnetic data storage media 14 using partition overlap register 18.

Random access memory (RAM) 12 is utilized by controller 10 to store information related to, among other things, refresh operations. In the example shown in FIG. 1, RAM 12 includes partition overlap register 18 and track-level damage count table 20. Although described as separate entities or tables of information, the information maintained within RAM 12 may be organized in any number of ways.

Track-level damage count table 20 is a list of damage counts associated with each of the plurality of data tracks T0-T3. As described in more detail below, track-level damage count table 20 is updated based on write operations performed with respect to each data track of data tracks T0-T3, and reflects the damage associated with respective tracks based on the effects of adjacent-track interference (ATI) and far-track interference (FTI) (collectively, "xTI"). As used herein, the term "adjacent track" may including an immediately adjacent track (e.g., tracks T0 and T2 are immediately adjacent to track T1) and non-immediately adjacent tracks (e.g., track T3 is non-immediately adjacent to track T1)

In accordance with the techniques of this disclosure, controller 10 determine whether to increment a track-level damage counter of track-level count table 20 based at least in part on partition overlap register 18. For example, controller 10 may cause read/write transducer 16 to write data to a data track, e.g., data track T0. In some examples, the data may consume only part of data track T0, such as partitions P0-P3. In general, controller 10 may cause read/write transducer 16 to write data to at least one partition of a data track.

During or after causing read/write transducer 16 to write data to partitions P0-P3 of data track T0, controller 10 may determine if data has been previously written to any one or more of partitions P0-P3 of data track T0. For example, controller 10 may inspect partition overlap register 18 to determine if data has been previously written to any partition of partitions P0-P3 of data track T0.

In some examples, partition overlap register 18 may include a respective partition overlap register entry for each partition of data track T0. Each respective partition overlap register entry may store an indication of whether the associated partition of data track T0 has been previously written to. In some examples, the respective partition overlap register entry may store an indication of whether the associated partition of data track T0 has been written to since damage was last applied to adjacent tracks due to xTI (e.g., to immediately adjacent tracks due to ATI, non-immediately adjacent tracks due to FTI, or both). The indication may include a binary value that indicates that, yes, the associated partition has been written to since damage was last applied to adjacent tracks (e.g., a 1) or, no, the associated partition has not been written to since damage was last applied to adjacent tracks (e.g., a 0).

Depending on whether zero or one or more partitions have been previously written to, controller 10 may take a certain, predetermined action. For example, in response to determining that none of partitions P0-P3 has been previously written to, controller 10 may be configured to set respective partition overlap register entries associated with P0-P3 to indicate that partitions P0-P3 have been written to. Additionally, controller 10 may be configured to refrain from incrementing the respective track-level damage counters associated with the adjacent tracks. In this way, if the portion of the track to which data is being written has not been written to previously (e.g., since damage was last applied to the adjacent tracks), the respective track-level damage counters associated with the adjacent tracks may not be incremented, which may help reduce a frequency of refresh operations.

As another example, in response to determining that one or more partition of partitions P0-P3 has been previously written to (e.g., since damage was last applied to the adjacent tracks), controller 10 may be configured to increment the respective track-level damage counters associated with the adjacent tracks. Additionally, controller 10 may be configured to set each respective partition overlap register entry of the partition overlap register 18, except for the register entry associated with the partition that has been previously written to, to indicate that each respective partition has not been previously written to. For example, if partition P3 has previously been written to, controller 10 may set the respective register entries for P0-P2 and P4-P7 to indicate that the respective partition has not been previously written to. Controller 10 also may be configured to set the partition overlap register entry associated with partition P3 to indicate that partition P3 has previously been written to.

In this way, if a partition in a data track to which data is being written has had data previously written to it (e.g., since damage was last applied to the adjacent tracks), controller 10 may apply damage to the adjacent tracks by incrementing the respective track-level damage counters associated with the adjacent tracks. Further, for the partitions other than partition P3 to which data had previously been written, the respective partition overlap register entries may be set to indicate that these partitions have not been written to since damage was last applied to adjacent tracks, which may reduce a likelihood that damage need be applied to adjacent tracks for a subsequent write to the data track T0. Nevertheless, the partition overlap register entry for partition P3, to which data had previously been written, is set to indicate that data has previously been written (e.g., since damage was last applied to the adjacent tracks), such that if data is written to P3 in a subsequent write to data track T0, further damage is assigned to the adjacent tracks. This results in accurate damage counting if a partition is written to repeatedly.

In some examples, in response to determining that no partitions of the plurality of partitions P0-P7 have been previously written to, controller 10 may also be configured to increment respective track-level damage counters associated with adjacent tracks. As such, an initial write to the data track T0 may result in damage being applied to adjacent tracks. Further, controller 10 may be configured to set respective register entries associated with partitions P0-P3 (to which data is being written) to indicate that the respective partitions P0-P3 have been written to. This allows initiation of the techniques described above during subsequent writes to the data track T0.

While the techniques described above were described with respect to track T0 and data being written to partitions P0-P3, the techniques may be applied to each respective data track of magnetic data storage medium 14 and any number of partitions per track.

Figure 2:
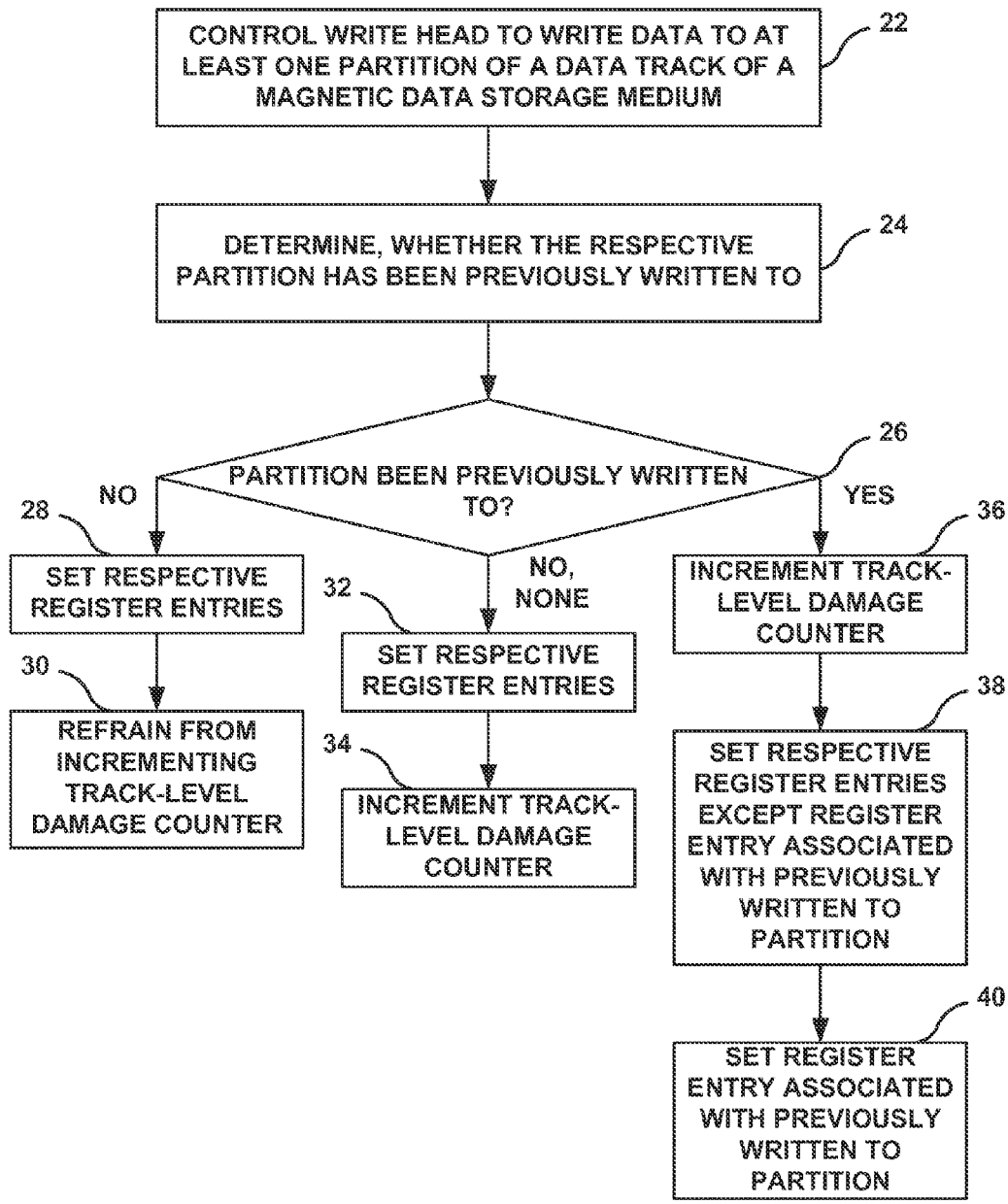
FIG. 2 is a flow diagram illustrating an example technique for determining whether to increment a track-level damage counter based at least in part on a partition overlap register.

FIG. 2 is a flow diagram illustrating an example technique for determining whether to increment a track-level damage counter based at least in part on a partition overlap register. In some examples, the technique of FIG. 2 may be implemented by magnetic data storage device 4 of FIG. 1, although the technique of FIG. 2 may be implemented by other data storage devices, and magnetic data storage device 4 may implement other techniques.

In general, the technique of FIG. 2 may include controlling, by controller 10, read/write transducer 16 to write data to at least one partition of a data track T0-T3 of magnetic data storage medium 14 (22). The technique of FIG. 2 also may include determining, by controller 10, for each respective partition of the at least one partition, whether the respective partition has been previously written to (e.g., since damage was last applied to the adjacent tracks) by inspecting partition overlap register 18 associated with the data track (24). In some examples, each data track may be associated with a respective partition overlap register 18. In response to determining that none of the respective partitions of the at least one partition to which data is being written has been previously written to ("NO" branch of decision block 26), controller 10 may be configured to set respective register entries associated with the respective partitions of the at least one partition to indicate that the respective partitions of the at least one partition have been written to (28), and refrain from incrementing the damage counter of the at least one adjacent track (30).

In some examples, in response to determining that no partitions of the plurality of partitions (i.e., no partitions of the data track) have been previously written to ("NO, NONE" branch of decision block 26), controller 10 may be configured to set respective register entries associated with the respective partitions of the at least one partition to indicate that the respective partitions of the at least one partition have been written to (32), and increment a damage counter of at least one adjacent track (34). In some examples, in response to determining that a partition of the at least one partition to which data is being written has been previously written to ("YES" branch of decision block 26), controller 10 may be configured to increment a damage counter of at least one adjacent track (36), set each respective register entry of the partition overlap register, except for the register entry associated with the partition that has been previously written to, to indicate that each respective partition has not been previously written to (38), and set the register entry associated with the partition that has been previously written to to indicate that the partition that has been previously written to has previously been written to (40).

FIGS. 3A-3D are conceptual diagrams illustrating examples of techniques for tracking write overlap using a partition overlap register. The examples illustrated in FIGS. 3A-3D are not exhaustive, but serve to illustrate how controller 10 uses partition overlap register to determine when to apply damage to adjacent tracks by incrementing track-level damage counters associated with the adjacent tracks. The examples illustrated in FIGS. 3A-3D will be illustrated with reference to magnetic data storage system 2 of FIG. 1 for ease of illustration, but it will be appreciated that the examples of FIGS. 3A-3D may be implemented by other storage systems, and magnetic data storage system 2 of FIG. 1 may execute other example techniques.

Figure 3A:
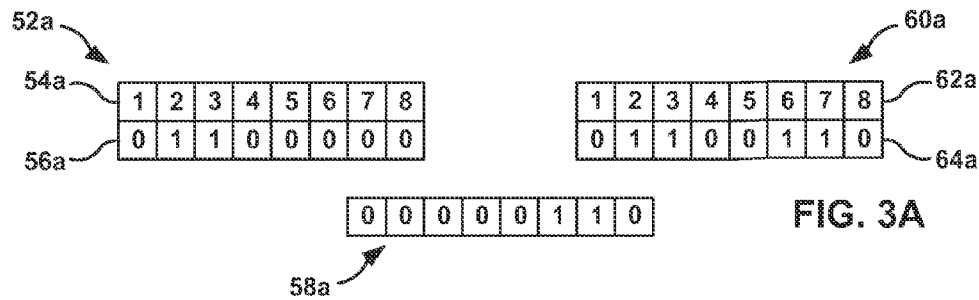
FIGS. 3A-3D are conceptual diagrams illustrating examples of techniques for tracking write overlap using a partition overlap register.

In FIG. 3A, partition overlap register table 52a illustrates an initial condition of partition overlap register entries associated with a data track including eight partitions. Row 54a includes entries indicating the partition number. Row 56a includes a respective partition overlap register entry for each respective partition. In FIGS. 3A-3D, a value of 0 for a partition overlap register entry indicates that data has not been previously written to that partition overlap register entry (e.g., since damage was last applied to adjacent tracks). A value of 1 for a partition overlap register entry indicates that data has been previously written to that partition overlap register entry (e.g., since damage was last applied to adjacent tracks). In the example of FIG. 3A, in the initial condition, partitions 2 and 3 have had data previously written to them (e.g., since damage was last applied to adjacent tracks). In the initial condition of FIG. 3A, partitions 1 and 4-8 have not had data previously written to them (e.g., since damage was last applied to adjacent tracks).

Controller 10 then controls read/write transducer 16 to write data to the track. In particular, as shown by row 58a, controller 10 causes read/write transducer 16 to write data to partitions 6 and 7, represented by 1's the sixth and seventh entries in row 38a. Controller 10 does not cause read/write transducer 16 to write data to partitions 1-5 and 8.

Partition overlap register table 60a shows the condition of the partition overlap register for the data track after the data is written to the track by read/write transducer 16 and controller 16 has updated the table. Row 32a includes entries indicating the partition number. Row 34a includes a respective partition overlap register entry for each respective partition. Because data was not written to any partitions that were previously set to 1 (indicating that data had been previously written to the partition), controller 10 updates the partition overlap register entries for partitions 6 and 7 to reflect that data was written to partitions 6 and 7. Further, because data was not written to any partitions that were previously set to 1 (indicating that data had been previously written to the partition), controller 10 does not increment track-level damage counters associated with adjacent tracks. In this way, because data was not written to any partitions in which data was previously written (e.g., since damage was last applied to adjacent tracks), damage is not needlessly applied to adjacent tracks. If controller 10 were to apply damage to adjacent tracks in this instance, damage would effectively be over counted, because the portions of adjacent tracks affected by the writing of data to partitions 6 and 7 were not affected by the previous writes (e.g., since damage was last applied to adjacent tracks).

Figure 3B:
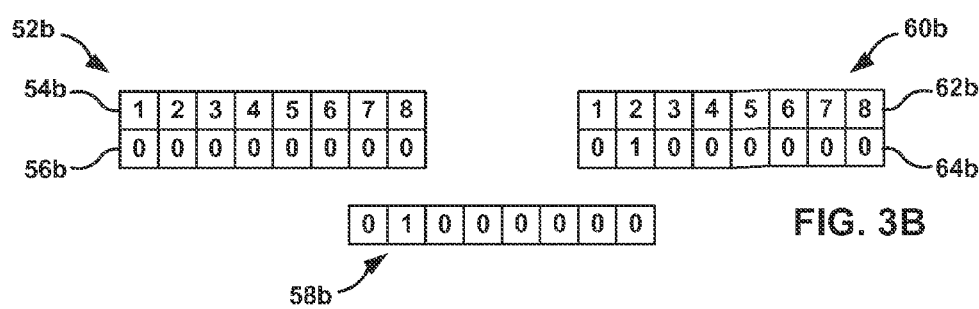

In FIG. 3B, partition overlap register table 52b illustrates an initial condition of partition overlap register entries associated with a data track including eight partitions. Row 54b includes entries indicating the partition number. Row 56b includes a respective partition overlap register entry for each respective partition. In the example of FIG. 3B, in the initial condition, no partitions have had data previously written to them (e.g., since damage was last applied to adjacent tracks).

Controller 10 then controls read/write transducer 16 to write data to the track. In particular, as shown by row 58b, controller 10 causes read/write transducer 16 to write data to partition 2, represented by the 1 in the second entry in row 58b. Controller 10 does not cause read/write transducer 16 to write data to partitions 1 and 3-8.

Partition overlap register table 60b shows the condition of the partition overlap register for the data track after the data is written to the track by read/write transducer 16 and controller 16 has updated the table. Row 62b includes entries indicating the partition number. Row 64b includes a respective partition overlap register entry for each respective partition. Because data was not written to any partitions that were previously set to 1 (indicating that data had been previously written to the partition), controller 10 updates the partition overlap register entry for partition 2 to reflect that data was written to partition 2. Further, because data had not been previously written to any partitions of the data track, controller 10 increments track-level damage counters associated with adjacent tracks. In this way, damage is properly applied to adjacent tracks when all partitions are indicated to not have had data written to them previously.

Figure 3C:
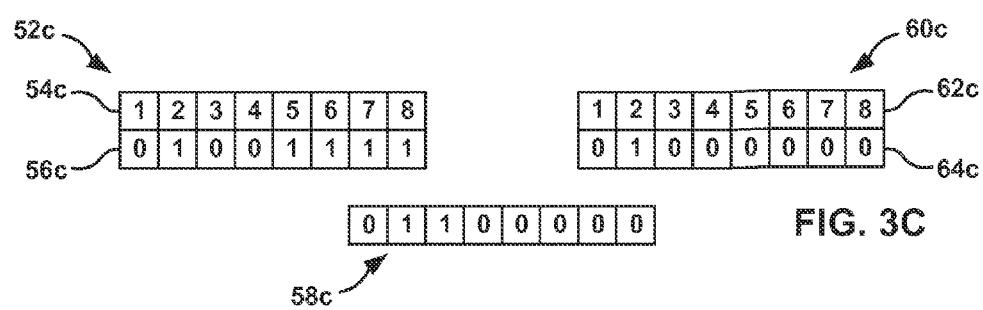

In FIG. 3C, partition overlap register table 52c illustrates an initial condition of partition overlap register entries associated with a data track including eight partitions. Row 54c includes entries indicating the partition number. Row 56c includes a respective partition overlap register entry for each respective partition. In the example of FIG. 2C, in the initial condition, partitions 2 and 4-7 have had data previously written to them (e.g., since damage was last applied to adjacent tracks). In the initial condition of FIG. 2C, partitions 1, 3, and 4 have not had data previously written to them (e.g., since damage was last applied to adjacent tracks).

Controller 10 then controls read/write transducer 16 to write data to the track. In particular, as shown by row 58c, controller 10 causes read/write transducer 16 to write data to partitions 2 and 3, represented by 1's the second and third entries in row 58c. Controller 10 does not cause read/write transducer 16 to write data to partitions 1 and 4-8.

Partition overlap register table 60c shows the condition of the partition overlap register for the data track after the data is written to the track by read/write transducer 16 and controller 16 has updated the table. Row 62c includes entries indicating the partition number. Row 64c includes a respective partition overlap register entry for each respective partition. Because data was written to partition 2, which was previously set to 1 (indicating that data had been previously written to partition 2), controller 10 increments track-level damage counters associated with adjacent tracks. Further, controller 10 updates the partition overlap register entries for all partitions at which controller 10 did not find an overlap (partitions 1 and 3-8) to reflect that data has not been previously written to these partitions (e.g., since damage was last applied to adjacent tracks). Controller 10 also sets the partition overlap register entry for partition 2 to indicate that data has been previously written to this partition (e.g., since damage was last applied to adjacent tracks). This prevents damage from being applied to adjacent tracks for a subsequent write unless data is written to partition 2. Further, this allows damage to properly be applied to adjacent tracks for a subsequent write if data is written to partition 2.

Further, if, instead of only partition 2 having a write overlap, partition 6 also had a write overlap, controller 10 also would set the partition overlap register entry for partition 6 to 1 to indicate that data has been previously written to this partition (e.g., since damage was last applied to adjacent tracks). In general, controller 10 may set the partition overlap register entry for partition 6 to 1 to indicate that data has been previously written to this partition for any partition that controller 10 determines had a write overlap.

Figure 3D:
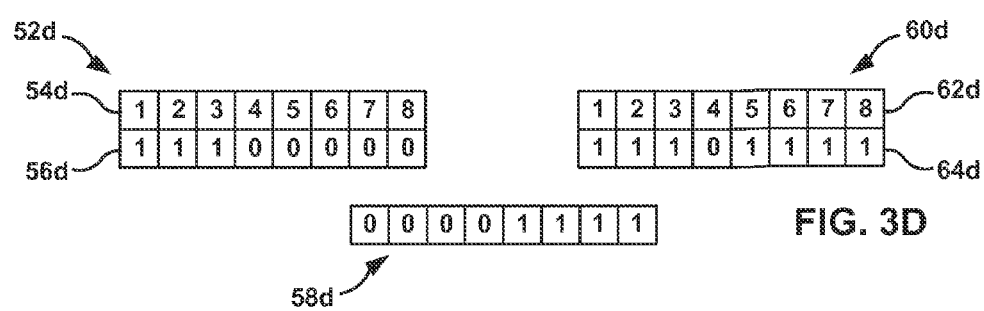

In FIG. 3D, partition overlap register table 52d illustrates an initial condition of partition overlap register entries associated with a data track including eight partitions. Row 54d includes entries indicating the partition number. Row 56d includes a respective partition overlap register entry for each respective partition. In the example of FIG. 3D, in the initial condition, partitions 1-3 have had data previously written to them (e.g., since damage was last applied to adjacent tracks). In the initial condition of FIG. 3D, partitions 4-8 have not had data previously written to them (e.g., since damage was last applied to adjacent tracks).

Controller 10 then controls read/write transducer 16 to write data to the track. In particular, as shown by row 58d, controller 10 causes read/write transducer 16 to write data to partitions 5-8, represented by 1's in the fifth through eighth entries in row 58d. Controller 10 does not cause read/write transducer 16 to write data to partitions 1-4.

Partition overlap register table 60d shows the condition of the partition overlap register for the data track after the data is written to the track by read/write transducer 16 and controller 16 has updated the table. Row 62d includes entries indicating the partition number. Row 64d includes a respective partition overlap register entry for each respective partition. Because data was not written to any partitions that were previously set to 1 (indicating that data had been previously written to the partition), controller 10 updates the partition overlap register entries for partitions 5-8 to reflect that data was written to partitions 5-8. Further, because data was not written to any partitions that were previously set to 1 (indicating that data had been previously written to the partition), controller 10 does not increment track-level damage counters associated with adjacent tracks. In this way, because data was not written to any partitions in which data was previously written (e.g., since damage was last applied to adjacent tracks), damage is not needlessly applied to adjacent tracks. If controller 10 were to apply damage to adjacent tracks in this instance, damage would effectively be over counted, since the portions of adjacent tracks affected by the writing of data to partitions 5-8 were not affected by the previous writes (e.g., since damage was last applied to adjacent tracks).

Although the preceding examples have been described with a single track associated with a corresponding partition overlap register, in other examples, multiple tracks may be associated with a single partition overlap register. For example, rather than a track being partitioned into eight partitions and each partition overlap register being associated with a single track, a track may be partitioned into 16 partitions and each partition overlap register may be associated with two tracks. In this way, while substantially maintaining a memory consumption of the partition overlap register, more granular or precise tracking of write overlap may be accomplished. In general, the number of partitions includes in each data track may be any power-of-two number, and the number of tracks associated with a single partitioned may be any power-of-two number. Example combinations include 8 partitions per track/1 track per partition overlap register; 16 partitions per track/2 tracks per partition overlap register; 32 partitions per track/4 tracks per partition overlap register; 64 partitions per track/8 tracks per partition overlap register; and 128 partitions per track/16 track per partition overlap register.

The number of partitions a track includes and the number of tracks associated with a single partition overlap register may be selected based on a RAM size dedicated to the partition overlap register, an expected workload of magnetic data storage device 4, or the like. For example, additional track partitions and an increased number of tracks per partition overlap register skews the benefit (of reduced unnecessary damage counting) to more limited partition workloads, as in limited partition workloads it is more likely that only a single track associated with a given partition overlap register is actively being written to.

In contrast, in full volume workloads (not limited partition workloads), additional track partitions and an increased number of tracks per partition overlap register may reduce the benefit due to ambiguity regarding from which track of the multiple tracks associated with a single partition overlap register the respective partition overlap register entries originate. This may lead to false indications of write overlap, and unnecessary refresh operations. For example, a magnetic data storage device 4 that includes 8 partitions per track and 1 track per partition overlap register may experience the full benefit of the techniques described herein at full volume workloads; a magnetic data storage device 4 that includes 16 partitions per track and 2 tracks per partition overlap register may experience the full benefit of the techniques described herein at 50% limited partition workloads; a magnetic data storage device 4 that includes 32 partitions per track and 4 tracks per partition overlap register may experience the full benefit of the techniques described herein at 25% limited partition workloads; a magnetic data storage device 4 that includes 64 partitions per track and 8 tracks per partition overlap register may experience the full benefit of the techniques described herein at 12.5% limited partition workloads; and a magnetic data storage device 4 that includes 128 partitions per track and 16 tracks per partition overlap register may experience the full benefit of the techniques described herein at 6.25% limited partition workloads.

In some examples in which multiple data tracks are associated with a single partition overlap register, the partition overlap register may include additional entries indicating which tracks are active; that is, which tracks have been written to since damage was last applied. This may help disambiguate the overlap information contained in the partition overlap register and reduce the penalty for associating multiple data tracks with a single partition overlap register. FIGS. 4A and 4B are example partition overlap registers that include active track indications.

As shown in FIG. 4A, partition overlap register 72a includes 32 bits, with 28 bits being used for partition overlap indications and 4 bits being used for active track indications. In the example of FIG. 4A, four tracks are associated with partition overlap register 72a. The active track indication bits provide a gain in the reduction of unnecessary refresh operations compared to a 28 partition, 4 track per partition overlap register that does not include active track indication bits. For example, the reduction in unnecessary refresh operations may be about 7%. Compared to the data structure in FIG. 4B, the data structure in FIG. 4A may utilize less storage space, may be contained in a single processor cache line, and undergo atomic clear operation.

As shown in FIG. 4B, partition overlap register 72b includes 36 bits, with 32 bits being used for partition overlap indications and 4 bits being used for active track indications. In the example of FIG. 4B, four tracks are associated with partition overlap register 72b. The active track indication bits provide a gain in the reduction of unnecessary refresh operations compared to a 32 partition, 4 track per partition overlap register that does not include active track indication bits. Compared to the data structure in FIG. 4A, the data structure in FIG. 4B may utilize more storage space, may be cleaner, with less masking, and has power-of-two partitions for mapping.

Figure 5:
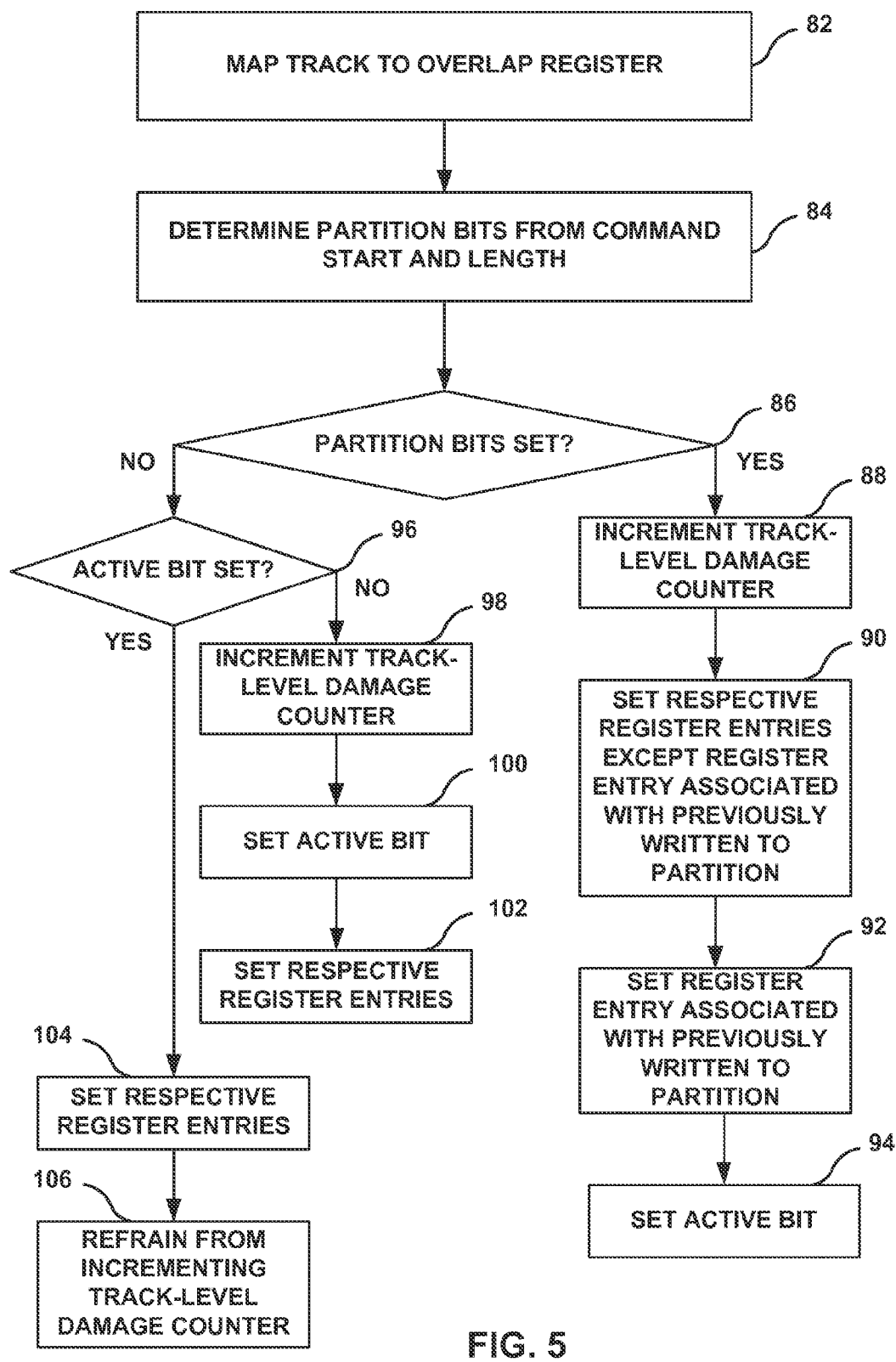
FIG. 5 is a flow diagram illustrating an example technique for determining whether to increment a track-level damage counter based at least in part on a partition overlap register.

FIG. 5 is a flow diagram illustrating an example technique for determining whether to increment a track-level damage counter based at least in part on a partition overlap register. The technique of FIG. 5 may be implemented when multiple tracks are associated with a single partition overlap buffer and active track indications are utilized. In some examples, the technique of FIG. 5 may be implemented by magnetic data storage device 4 of FIG. 1, although the technique of FIG. 5 may be implemented by other data storage devices, and magnetic data storage device 4 may implement other techniques.

The technique of FIG. 5 includes mapping, by controller 10, the data track to which data is being written to partition overlap register 18 (82). Controller 10 may utilize one of a variety of techniques to map the data track to partition overlap register 18 (82), including, for example, a mapping table, a hash function, or the like.

The technique of FIG. 5 also includes determining, by controller 10, which partitions are being written to based on the write command start partition and the length of the data to be written (84). Controller 10 then inspects the partition overlap register 18 to determine whether any of the partitions being written to have been previously written to (e.g., since damage was last applied and the partition overlap register reset) (86). In response to determining that at least one of the partitions being written to have been previously written to (e.g., since damage was last applied and the partition overlap register reset) (the "YES" branch of decision block 86), controller 10 may increment respective track-level damage counters associated with adjacent tracks (88). Further, controller 10 may set each respective register entry of the partition overlap register, except for the register entry associated with the partition that has been previously written to, to indicate that each respective partition has not been previously written to (90), and set the register entry associated with the partition that has been previously written to to indicate that the partition that has been previously written to has previously been written to (92). Finally, controller 10 also may set the active track indication bit associated with the data track to which the data was written (94).

In response to determining that none of the partitions being written to have been previously written to (e.g., since damage was last applied and the partition overlap register reset) (the "NO" branch of decision block 86), controller 10 may determine if the active track indication bit for the data track to which data is being written is set, which indicates that the data track has been previously been written to (e.g., since damage was last applied and the partition overlap register reset) (96). In response to determining that the active track indication bit is not set, which indicates that the data track has not been previously been written to (e.g., since damage was last applied and the partition overlap register reset) and that the partition overlap register provides no information regarding the data track (the "NO" branch of decision block 96), controller 10 may increment the respective track-level damage counters associated with tracks adjacent to the data track to which data is being written (98). Further, controller 10 may set the active track indication bit associated with the data track to which the data was written (100), and may set respective register entries associated with the respective partitions to which data is being written to indicate that the respective partitions have been written to (102).

In response to determining that the active track indication bit is set, which indicates that the data track has been previously been written to (e.g., since damage was last applied and the partition overlap register reset) (the "YES" branch of decision block 96), controller 10 may set respective register entries associated with the respective partitions to which data is being written to indicate that the respective partitions have been written to (104) and refrain from incrementing respective track-level damage counters associated with track adjacent to the track to which data is being written (106).

In some examples, in addition to determining whether to increment a track-level damage counter based on a partition overlap register, controller 10 may implement a sector overlap register to determine whether to set a partition overlap register entry to indicate that the partition has been previously written to. In some examples, controller 10 may implement the sector overlap register as a cache storing a sector addresses for a predetermined number of previous writes. For example, the number previous writes for which the sector overlap register stores sector addresses may be about 4,000. Each time controller 10 causes read/write transducer 16 to write data to sectors of magnetic data storage media 14, controller 10 may inspect the sector overlap register (prior to inspecting the partition overlap register) to determine if data has been written to the respective sectors within the last number of writes for which sector addresses are stored in the sector overlap register. If a respective sector address to which data is being written is in the sector overlap register, controller 10 may proceed to inspect the partition overlap register for the associated data track utilizing a technique described herein to determine whether to apply damage based on the write operation. However, if a respective sector address to which data is being written is not in the sector overlap register, controller 10 may refrain from inspect the partition overlap register for the associated data track, and may refrain from incrementing respective track-level damage counters associated with track adjacent to the track to which data is being written.

In some examples, instead of inspecting the partition overlap register for the associated track in response to finding a sector address in the sector overlap register, controller 10 may increment respective track-level damage counters associated with track adjacent to the track to which data is being written. In other words, instead of implementing both a sector overlap register and a partition overlap register to determine whether to increment respective track-level damage counters associated with track adjacent to the track to which data is being written, controller 10 may, in some examples, only implement a sector overlap register to determine whether to increment respective track-level damage counters associated with track adjacent to the track to which data is being written, and may omit the partition overlap register.

In some examples, controller 10 may implement an integer hash to map the sector address to the sector overlap register, to map the partition to the partition overlap register, or both. An integer hash may allow more efficient utilization of the cache. For example, a track number and partition number may be input to the integer hash, and the integer hash may output a unique number that includes a slot index and a residual. The slot index points to a location in the cache and the residual uniquely identifies the content of the slot index. In some examples, the track number may be a 21 bit number and the partition number may be a 5 bit number. Inputting these 26 bits into the integer hash may generate a 26 bit number in which 10 bits are the slot index and 16 bits are the residual. In some examples, each slot is 32 Bytes, and stores 4 partition overlap entries. Of the 32 Bytes, 8 Bytes may be consumed by the 4 16-bit residuals, 1 Byte may be consumed by a valid mask, 4 Bytes may be consumed by rank information, 1 Byte may be consumed by next rank information, 16 Bytes may be consumed by sector overlap registers (4 Bytes of sector overlap register information for each of the 4 partition overlap entries), and 2 Bytes may be spare.

The techniques described in this disclosure may be implemented, at least in part, in hardware, software, firmware, or any combination thereof. For example, various aspects of the described techniques may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processing units, or other processing units, to implement one or more of the techniques described herein, such as when instructions included or encoded in the computer-readable storage medium are executed by the one or more processing units. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A method comprising:
    controlling, by a processor, a write head to write data to at least one partition of a data track of a magnetic data storage medium, wherein the data track is partitioned into a plurality of partitions;
    determining, by the processor, for each respective partition of the at least one partition, whether the respective partition has been previously written to by inspecting a partition overlap register associated with the data track, wherein the partition overlap register stores a respective register entry for each respective partition of the plurality of partitions indicating whether the respective partition has been previously written to; and
    in response to determining that none of the respective partitions of the at least one partition has been previously written to:
        setting respective register entries associated with the respective partitions of the at least one partition to indicate that the respective partitions of the at least one partition have been written to; and
        refraining from incrementing a damage counter of at least one adjacent track.

2. The method of claim 1, further comprising:
    in response to determining that no partitions of the plurality of partitions have been previously written to:
        setting, by the processor, respective register entries associated with the respective partitions of the at least one partition to indicate that the respective partitions of the at least one partition have been written to; and
        incrementing, by the processor, the damage counter of the at least one adjacent track.

3. The method of claim 1, further comprising:
    in response to determining that a partition of the at least one partition has been previously written to:
        incrementing, by the processor, the damage counter of the at least one adjacent track;
        setting, by the processor, each respective register entry of the partition overlap register, except for the register entry associated with the partition that has been previously written to, to indicate that each respective partition has not been previously written to; and
        setting, by the processor, the register entry associated with the partition that has been previously written to to indicate that the partition that has been previously written to has previously been written to.

4. The method of claim 1, wherein the number of partitions is different than a number of sectors into which the data track is divided.

5. The method of claim 4, wherein each respective partition comprises a plurality of sectors, further comprising, prior to determining, for each respective partition of the at least one partition, whether the respective partition has been previously written to by inspecting the partition overlap register:
    determining, by the processor, for each respective sector of the plurality of sectors, whether the respective sector has been previously written to by inspecting a sector overlap cache, wherein the sector overlap cache stores a respective register entry for each respective sector indicating whether the respective sector has been previously written to within a predetermined number of previous writes; and
    in response to determining that at least one respective sector of the plurality of sectors has been previously written to, setting, by the processor, for a respective partition associated with a respective sector that has been previously written to, a register entry in the partition overlap registry to a value indicating that the respective partition has been previously written to.

6. The method of claim 1, wherein a plurality of data tracks are associated with a single partition overlap register.

7. The method of claim 6, wherein the partition overlap register further comprises entries indicating whether each respective track of the plurality of data tracks has been previously written to.

8. A storage device comprising:
    a magnetic data storage medium;
    a write head; and
    a processor, wherein the processor is configured to:
        control the write head to write data to at least one partition of a data track of the magnetic data storage medium, wherein the data track is partitioned into a plurality of partitions;
        determine, for each respective partition of the at least one partition, whether the respective partition has been previously written to by inspecting a partition overlap register associated with the data track, wherein the partition overlap register stores a respective register entry for each respective partition indicating whether the respective partition has been previously written to; and
        in response to determining that none of the respective partitions of the at least one partition has been previously written to:
            set respective register entries associated with the respective partitions of the at least one partition to indicate that the respective partitions of the at least one partition have been written to; and
            refrain from incrementing a damage counter of at least one adjacent track.

9. The storage device of claim 8, wherein the processor is further configured to, in response to determining that no partitions of the plurality of partitions have been previously written to:
    set respective register entries associated with the respective partitions of the at least one partition to indicate that the respective partitions of the at least one partition have been written to; and
    increment the damage counter of the at least one adjacent track.

10. The storage device of claim 8, wherein the processor is further configured to, in response to determining that a partition of the at least one partition has been previously written to:
    increment the damage counter of the at least one adjacent track;
    set each respective register entry of the partition overlap register, except for the register entry associated with the partition that has been previously written to, to indicate that each respective partition has not been previously written to; and
    set the register entry associated with the partition that has been previously written to to indicate that the partition that has been previously written to has previously been written to.

11. The storage device of claim 8, wherein the number of partitions is different than a number of sectors into which the data track is divided.

12. The storage device of claim 11, wherein each respective partition comprises a plurality of sectors, wherein the processor is further configured to, prior to determining, for each respective partition of the at least one partition, whether the respective partition has been previously written to by inspecting the partition overlap register:
- determine, for each respective sector of the plurality of sectors, whether the respective sector has been previously written to by inspecting a sector overlap cache, wherein the sector overlap cache stores a respective register entry for each respective sector indicating whether the respective sector has been previously written to within a predetermined number of previous writes; and
- in response to determining that at least one respective sector of the plurality of sectors has been previously written to, set, for a respective partition associated with a respective sector that has been previously written to, a register entry in the partition overlap registry to a value indicating that the respective partition has been previously written to.

13. The storage device of claim 8, wherein a plurality of data tracks are associated with a single partition overlap register.

14. The storage device of claim 13, wherein the partition overlap register further comprises entries indicating whether each respective track of the plurality of data tracks has been previously written to.

15. A storage device comprising:
- means for magnetically storing data;
- means for writing data to the means for magnetically storing data;
- means for controlling the means for writing data to write data to at least one partition of a data track of the magnetic data storage medium, wherein the data track is partitioned into a plurality of partitions;
- means for determining, for each respective partition of the at least one partition, whether the respective partition has been previously written to by inspecting a partition overlap register associated with the data track, wherein the partition overlap register stores a respective register entry for each respective partition indicating whether the respective partition has been previously written to; and
- means for, in response to determining that none of the respective partitions of the at least one partition has been previously written to:
  - setting respective register entries associated with the respective partitions of the at least one partition to indicate that the respective partitions of the at least one partition have been written to; and
  - refraining from incrementing a damage counter of at least one adjacent track.

16. The storage device of claim 15, further comprising:
means for, in response to determining that no partitions of the plurality of partitions have been previously written to:
- setting, by the processor, respective register entries associated with the respective partitions of the at least one partition to indicate that the respective partitions of the at least one partition have been written to; and
- incrementing, by the processor, the damage counter of the at least one adjacent track.

17. The storage device of claim 15, further comprising:
means for, in response to determining that a partition of the at least one partition has been previously written to:
- incrementing, by the processor, the damage counter of the at least one adjacent track;
- setting, by the processor, each respective register entry of the partition overlap register, except for the register entry associated with the partition that has been previously written to, to indicate that each respective partition has not been previously written to; and
- setting, by the processor, the register entry associated with the partition that has been previously written to to indicate that the partition that has been previously written to has previously been written to.

18. A non-transitory computer-readable storage medium comprising instructions that, when executed, cause one or more processors of a storage device to:
- control a write head to write data to at least one partition of a data track of the magnetic data storage medium, wherein the data track is partitioned into a plurality of partitions;
- determine, for each respective partition of the at least one partition, whether the respective partition has been previously written to by inspecting a partition overlap register associated with the data track, wherein the partition overlap register stores a respective register entry for each respective partition indicating whether the respective partition has been previously written to; and
- in response to determining that none of the respective partitions of the at least one partition has been previously written to:
  - set respective register entries associated with the respective partitions of the at least one partition to indicate that the respective partitions of the at least one partition have been written to; and
  - refrain from incrementing a damage counter of at least one adjacent track.

19. The non-transitory computer-readable storage medium of claim 18, further comprising instruction that, when executed, cause the processor to:
- in response to determining that no partitions of the plurality of partitions have been previously written to:
  - set respective values of respective register entries associated with the respective partitions of the at least one partition to indicate that the respective partitions of the at least one partition have been written to; and
  - increment the damage counter of the at least one adjacent track.

20. The non-transitory computer-readable storage medium of claim 18, further comprising instruction that, when executed, cause the processor to:
- in response to determining that a partition of the at least one partition has been previously written to:
  - increment the damage counter of the at least one adjacent track;
  - set the respective indication for each respective register entry of the partition overlap register, except for the register entry associated with the partition that has been previously written to, to indicate that each respective partition has not been previously written to; and
  - set the register entry associated with the partition that has been previously written to to indicate that the partition that has been previously written to has previously been written to.

* * * * *